A. ALLCOTT.
Improvement in Hubs for Carriage-Wheels.
No. 127,823. Patented June 11, 1872.
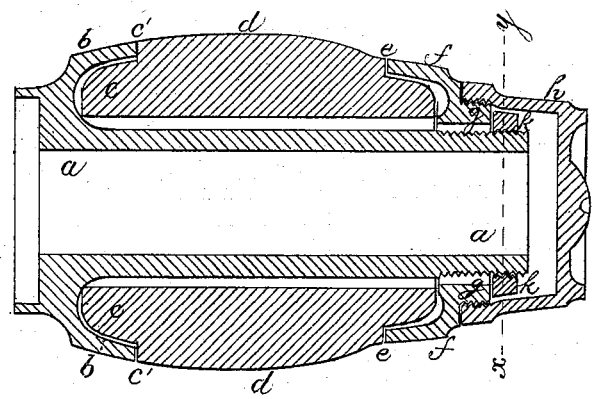
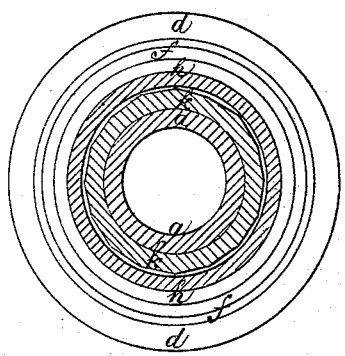
Witnesses
Saml. M. Barton
Jesse F. Wheeler
Inventor
Alonzo Allcott
by his atty
Carroll D. Wright

UNITED STATES PATENT OFFICE.

ALONZO ALLCOTT, OF HAVERHILL, MASSACHUSETTS.

IMPROVEMENT IN HUBS FOR CARRIAGE-WHEELS.

Specification forming part of Letters Patent No. 127,823, dated June 11, 1872.

SPECIFICATION.

I, ALONZO ALLCOTT, of Haverhill, in the county of Essex and State of Massachusetts, have invented certain Improvements in Hubs for Carriage and other Wheels, of which the following is a specification:

Figure 1 of the drawing is a central vertical longitudinal section, and Fig. 2 is a transverse vertical section taken in the line $x y$, of my improved hub.

The present invention relates to certain new and useful improvements in carriage and other hubs, having for its principal objects a ready means of adjusting and securely holding the hub to the box of a wheel, as well as the easy detachment of the hub from the box in case of repair, and also to prevent the liability of the wheel slipping off from the box, which it is often apt to do by the working out of the devices required in attaching the hub to the box of the wheel by the ordinary methods. My improvement consists mainly in providing the box and hub of a wheel with projecting beveled bands, one permanently formed on one end of the box, and the other made adjustable and fitting over the other end of the box, the said bands being arranged to fit over and securely hold the ends of the hub which is firmly pressed in the bands, and may be readily adjusted to or detached from the box, by means of an adjustable screw, ring, or nut, operating on a screw-thread cut on the other end of the box.

In the drawing, $a\ a$ represent the box of a wheel, one end of which is formed with a permanent metallic beveled rim or band, $b\ b$, which projects from the box $a\ a$, and is curved or otherwise suitably formed, so as to receive one end, $c\ c$, of the hub $d\ d$ which is sunk and beveled so as to form a shoulder, $c'\ c'$, and admit of the end $c\ c$ of the hub $d\ d$ being properly fitted in and held by the band $b\ b$. The other end of the hub $d\ d$ is formed with a shoulder, $e\ e$, and beveled similar to that above described, so as to fit in and be held by an adjustable beveled metallic rim or band, $f f$, projecting from a collar, $g$, having outer screw-threads in which engage screw-threads formed on the inner periphery of a molded cap, $h$. The box $a\ a$ has screw-threads formed on the outer periphery of its other end, and passes through the hub $d\ d$ and the band $f f$ so as to receive a screw ring or nut, $k\ k$, which finds a bearing against the collar $g$ of the beveled band $f f$ and firmly presses and securely holds the band $f f$ on the hub $d\ d$. The cap $h$ fitting over the nut $k\ k$ and screwing on to the collar $g$ of the band $f f$, forms a protection to the box $a\ a$ and a finish to the hub $d\ d$. Reference being had to the drawing it will readily be seen that by forming the hub $d\ d$ with beveled ends provided with the metallic beveled bands $b\ b$ and $f f$, which are tightened and pressed firmly up and securely held on the hub $d\ d$ by the screw ring or nut $k\ k$, so that any wear of the hub $d\ d$ is readly taken up and the bands $b\ b$ and $f f$ are brought up nearer the spokes of the wheel and the hub is tightly bound, and any injury likely to arise from the flaking up or cracking of the hub $d\ d$ is prevented. By forming the box $a\ a$ with screw-threads on the outer periphery of one end and operating the screw ring or nut $k\ k$ thereon against the collar $g$ of the beveled band $f f$, the latter is firmly held in place and at the same time the adjustable screw ring or nut $k\ k$, working on the screw-end of the box $a\ a$, furnishes a ready means for attaching the band $f f$ to the hub $c\ c$, which, in the ordinary methods, is held by means of a band fastened by screws or nails, or shrunk on by heat, any of which is objectionable on account of the unloosening of the nails, or screws, or of the trouble and expense required in shrinking the bands, and their liability to expand and become displaced by the working out of the wedges required to tighten the box on to the hub, and of the weakening the strength of the wood by the heating of the band on to the hub. Moreover, in shrinking the tire of the wheel, when required to be reset, the spokes of the wheel are often driven or pressed in so as to interfere with the box and prevent them coming on to the shoulder and being tight after the tire is set, in which case it is necessary to cut off the end of the interfering spoke in the hub, which, in the ordinary arrangement it is very difficult to do on account of the box being wedged on, and the risk incurred of damaging the wheel by taking out and replacing the box; but in my improvements by merely unscrewing the cap $h$ and the nut $k\ k$ on one end of the box $a\ a$, access may be readily had to the inside of the hub $d\ d$ by simply withdrawing the box *a a* without risk, expense, or trouble of any account; and by replacing the box *a a* in the hub *d d*, putting the band *f f* on the end of the hub fitted for it, and screwing on the nut *k k* and cap *h*, the hub *d d* is firmly secured without any liability of its parts becoming disengaged, with a very little trouble and no expense.

The aperture of the band *f f* is made larger so as not to fit closely to the box *a a*, in order to allow the box *a a* to be carried out of the center, if required, to accommodate the rim of the wheel, which is apt to warp more or less, and, in consequence, often requires to be trimmed up or carried a little from the center.

Having thus fully described my improvements, what I claim as my invention, and desire to have secured to me by Letters Patent, is—

The combination of the hub *d*, box *a*, having rigid band *b*, adjustable band *f*, ring *k*, and cap *h*, all arranged as specified.

In testimony whereof I have signed my name to this specification in the presence of two subscribing witnesses.

ALONZO ALLCOTT.

Witnesses:
SAML. M. BARTON,
CYRUS W. ALCOTT.